(12) United States Patent
Dunsterville et al.

(10) Patent No.: US 11,846,383 B2
(45) Date of Patent: Dec. 19, 2023

(54) ANTI-CORROSIVE WRAPPING FOR METAL PIPES AND METAL PIPE FITTINGS

(71) Applicant: Winn & Coales International Limited, London (GB)

(72) Inventors: Brian Robert Dunsterville, London (GB); Stephen Michael Crawley, London (GB)

(73) Assignee: WINN & COALES INTERNATIONAL LIMITED, London (GB)

( * ) Notice: Subject to any disclaimer, the term of this patent is extended or adjusted under 35 U.S.C. 154(b) by 31 days.

(21) Appl. No.: 17/610,520

(22) PCT Filed: May 14, 2020

(86) PCT No.: PCT/EP2020/063463
§ 371 (c)(1),
(2) Date: Nov. 11, 2021

(87) PCT Pub. No.: WO2020/229600
PCT Pub. Date: Nov. 19, 2020

(65) Prior Publication Data
US 2022/0214005 A1    Jul. 7, 2022

(30) Foreign Application Priority Data

May 16, 2019    (GB) .................................... 1906931

(51) Int. Cl.
*F16L 58/16*    (2006.01)
*B29C 63/10*    (2006.01)
*B29C 63/48*    (2006.01)

(52) U.S. Cl.
CPC .............. *F16L 58/16* (2013.01); *B29C 63/10* (2013.01); *B29C 63/486* (2013.01)

(58) Field of Classification Search
CPC ........ F16L 55/1686; F16L 55/175; F16L 9/02
USPC ............. 138/172, 110, 129, 130, 99, DIG. 6
See application file for complete search history.

(56) References Cited

U.S. PATENT DOCUMENTS

| | | | | |
|---|---|---|---|---|
| 3,757,829 A | * | 9/1973 | Berry | F16L 58/1063 138/146 |
| 3,939,874 A | * | 2/1976 | Gray | F16L 58/16 428/468 |
| 3,967,651 A | | 7/1976 | Snyder et al. | |
| 4,014,370 A | * | 3/1977 | McNulty | F16L 9/14 138/144 |

(Continued)

*Primary Examiner* — Patrick F Brinson
(74) *Attorney, Agent, or Firm* — FisherBroyles, LLP; Jason P. Mueller

(57) ABSTRACT

The present disclosure provides an anti-corrosive wrapping for a metal pipe (10) (or a metal pipe fitting). The wrapping has an innerwrap (14) including glass fibres which carries a viscoelastic thermoplastic corrosion protection material (13). The wrapping has an outerwrap (16) including glass fibres which is impregnated with an adhesive. The innerwrap (14) is wrappable around the metal pipe (10) with the viscoelastic thermoplastic corrosion protection material (13) carried by the innerwrap (14) engaging and covering an external surface of the metal pipe (10). The outerwrap (16) is wrapped around the innerwrap (13) and the adhesive impregnated in the outerwrap (16) penetrates the innerwrap (13) and thereby adheres the outerwrap (16) to the innerwrap (13).

23 Claims, 3 Drawing Sheets

(56) References Cited

U.S. PATENT DOCUMENTS

| | | | |
|---|---|---|---|
| 4,676,276 A | 6/1987 | Fawley | |
| 5,894,864 A * | 4/1999 | Rich | F16L 55/1686 |
| | | | 138/97 |
| 2011/0079311 A1 * | 4/2011 | Lazzara | F16L 13/0272 |
| | | | 156/188 |
| 2015/0204476 A1 * | 7/2015 | Lazzara | F16L 9/128 |
| | | | 156/178 |
| 2016/0290534 A1 * | 10/2016 | Taylor | B29C 53/58 |
| 2018/0252339 A1 * | 9/2018 | Dalmolen | F16L 11/082 |
| 2018/0266613 A1 * | 9/2018 | Walker | F16L 55/175 |
| 2018/0328521 A1 * | 11/2018 | Taylor | B29C 65/18 |

\* cited by examiner

ABSTRACT

ANTI-CORROSIVE WRAPPING FOR METAL PIPES AND METAL PIPE FITTINGS

CROSS-REFERENCE TO RELATED APPLICATIONS

This application is a national stage entry application under 35 U.S.C. 371 of PCT Patent Application No. PCT/EP2020/063463, filed 14 Mar. 2020, which claims priority to GB Patent Application No. 1906931.9, filed 16 May 2019, the entire contents of each of which are incorporated herein by reference.

FIELD

The present disclosure relates to an anti-corrosive wrapping suitable for wrapping metal pipes, metal pipe fittings and other metalwork and metal components.

BACKGROUND

The primary means of prevention of corrosion of buried metal pipes and metal pipe fittings is an anti-corrosive coating applied to the pipes, for instance as a spray-applied liquid coating and/or by winding an anti-corrosive wrapping around the pipes or pipe fittings (typically the majority of the length of each pipe section of a pipeline is spray-coated with a coating and then the pipe joints connecting the pipe sections will be wrapped with an anti-corrosive wrapping, for instance a tape).

In U.S. Pat. No. 4,983,449 there is described an anti-corrosive wrapping for wrapping buried metal pipes which is suitable for use in tandem with cathodic protection. The wrapping comprises an innerwrap comprising a bitumen layer bonded to a non-elastic porous backing of flat thermoplastic fibres (e.g. fibres of polypropylene) woven in a basket weave fabric to provide a substantially non-elastic porous support. A release film is used to over the exposed face of the bitumen layer prior to application. Since the woven fabric is non-elastic it is resistant to soil stress, in that it will not readily stretch in the same way as the elastic PE and PVC backings of other anti-corrosive wrappings. In practice typically a further outerwrap (e.g. of glass fibre matting) is wound over the woven polypropylene fabric to provide protection against damage from sharp objects, e.g. flints, present in the soil.

The anti-corrosive wrapping of U.S. Pat. No. 4,983,449 presents three technical issues to be addressed: 1. it is difficult to adhere the outerwrap to the woven polypropylene fabric backing of the innerwrap; 2. the anti-corrosive wrapping is difficult to hand apply since the release layer of the innerwrap does not tear by hand easily (if at all) and; 3. the innerwrap and/or outerwrap often require(s) application by a wrapping machine in order to place it or them under sufficient tension.

SUMMARY

The present disclosure provides an anti-corrosive wrapping according to claim 1 and a method of applying anti-corrosive protection to a metal component as claimed in claim 14. Features of the anti-corrosive wrapping are set out in claims 2 to 13 and steps of the method are set out in claims 14 to 23. The present disclosure further provides metal pipe and/or a metal pipe fitting protected from corrosion by the method of any one of claims 14 to 23 and a corrosion protected article as claimed in claim 21.

The present disclosure provides an anti-corrosive wrapping suitable for wrapping metal pipes, metal pipe fittings and other metalwork and metal components wrapping, in which the outerwrap is easily adhered to the innerwrap and which is easy to hand apply and so does not need the use of a wrapping machine.

The present disclosure also does not require application of a primer to the pipeline prior to wrapping and is, to a degree, self-repairing (as will described below), which are further advantages over the prior art anti-corrosive wrapping.

The present disclosure will now be further described. In the following passages different aspects of the disclosure are defined in more detail. Each aspect described and the individual features thereof may be combined with any other aspect or aspects unless clearly indicated to the contrary. In particular, any feature indicated as being advantageous may be combined with any other feature or features indicated as being advantageous. It will be recognized that features described in the context of one aspect may be combined with other aspects where appropriate.

BRIEF DESCRIPTION OF THE SEVERAL VIEWS OF THE DRAWINGS

Embodiments of the present disclosure will now be described with reference to the accompanying drawings, in which.

DETAILED DESCRIPTION OF THE DISCLOSURE

Figure 1:
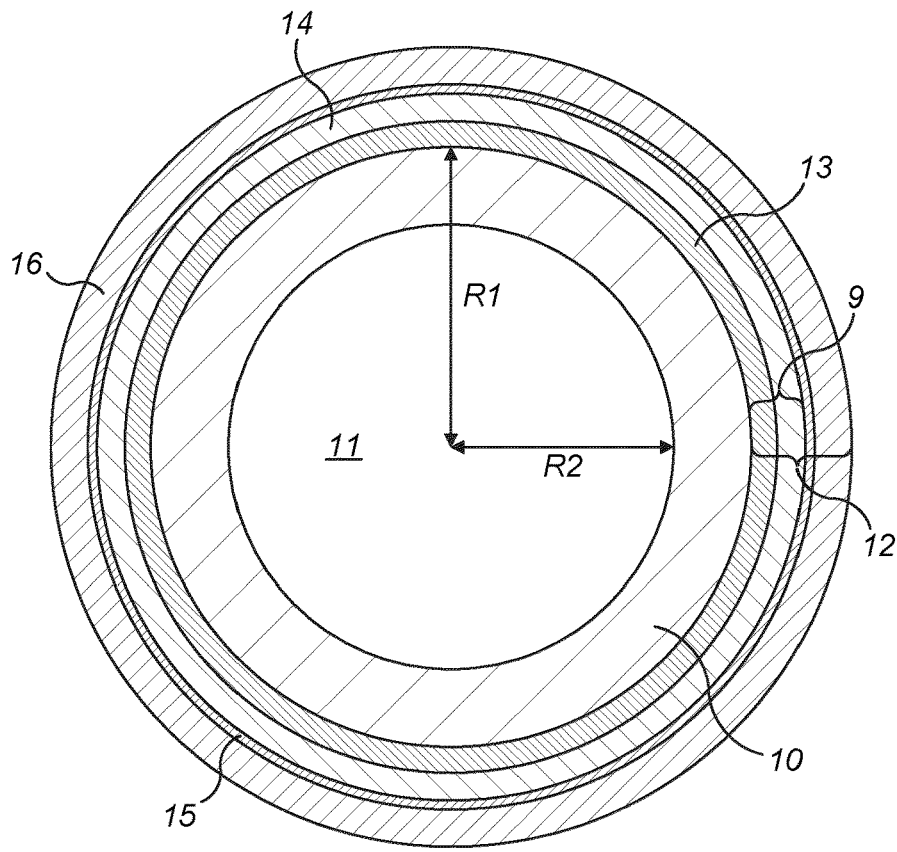
FIG. 1 is a cross-section of a pipe wrapped with an anti-corrosive wrapping according to one embodiment.

In FIG. 1 there can be seen in cross-section a metal pipe 10 with an external radius R1 and an internal radius R2. Wrapped around the pipe 10 is an anti-corrosive wrapping 12 which comprises several layers. For ease of illustration the wrapped pipe 10 is shown also in FIG. 2, with the different layers of the wrapping 12 exposed to view.

Adjacent to the pipe 10 and in contact with an external metal surface of the pipe 10 is a layer 13 of a viscous flowable material, in the illustrated embodiment a viscoelastic corrosion protection material. The viscoelastic corrosion protection material can comprise one or more of: bitumen, an elastomer, a process oil, a resin, a tackifier, a butyl rubber compound, a functionally modified elastomer, polybutene, poly-isobutene (these may be used each alone or in a mixture or combination of two or more of them).

In an embodiment the viscoelastic corrosion protection material comprises the material (the adhesive component) described in WO2019/008353 A1, namely a material comprising a functionally modified elastomer, e.g., 10 to 50 wt % functionally modified elastomer (in an embodiment from 10 to 30 wt %, in a further embodiment 12 to 20 wt %) and 0.1 to 20 wt % discrete reinforcing strands dispersed within the material. By "elastomer" it is meant a polymer that can be stretched and that returns to its original shape or length without significant permanent deformation. By "functionally modified elastomer" (FME) it is meant an elastomer which has pendent and/or terminal functional groups. In an embodiment, these functional groups are polar functional groups. The nature, make-up, positioning, etc., of the functional groups will determine the physical and/or chemical properties of the elastomer, and will thus be selected to impart desired properties. In an embodiment, the FME has a glass transition temperature (Tg) of less than −20° C. Accordingly, the FME may exhibit elastomeric rather than glass-like properties at some of the temperatures at which the wrap may be used. In some applications the viscoelastic corrosion protection material may be "self-healing". By "self-healing" it is meant that the material has a sufficiently low viscosity to allow it to flow under pressure to fill any points of damage, but sufficiently high to prevent downwards flow in vertical installations. The self-healing tendency is promoted by both the spontaneous recovery of elastomeric materials, upon the removal of any external deformational force, and from the inward compressive force provided by the tension applied to the wrap. In an embodiment, the FME has a weight average molecular weight of from, e.g., 50,000 to 400,000 g/mol. The functionally modified elastomer (FME) may comprise an elastomeric backbone including a plurality of side chains bearing at least one polar functional group, in an embodiment wherein the at least one polar functional group is selected from the group consisting of a carboxylic acid, chloro, chlorosulfanyl, epoxy, nitrile, sulphide, and mixtures of two or more thereof. The FME may be selected from the group consisting of an acrylic polymer, a carboxylic polymer, polychloroprene, chlorinated polyethylene, a chlorosulphanyl polymer, a epichlorohydrin polymer, an ethylene acrylic copolymer, isobutylene-paramethylstyrene copolymer, a nitrile polymer, a blend of PVC and a nitrile polymer, polysulphide polymer, a styrene butadiene copolymer, and mixtures of two or more thereof. In an embodiment, the FME is selected from a) carboxylic polymer, b) chlorinated polyethylene, c) chlorosulphonated polyethylene, d) polychloroprene, e) nitrile polymer, and f) a blend of a nitrile polymer and PVC, and mixtures thereof. The discrete reinforcing strands may typically have a length of from 2 to 8 mm. In an embodiment, the discrete reinforcing strands include strands having a length of from 2 to 4 mm, and optionally also strands having a length of from 5 to 8 mm. In an embodiment, the strands having a length of from 2 to 4 mm and the optional strands having a length of from 5 to 8 mm are present in a weight ratio of from 1:5 to 1:50, in a further embodiment from 1:10 to 1:40. The discrete reinforcing strands may be chopped synthetic textile fibre strands, in a particular embodiment the chopped synthetic textile fibre strands are polyester strands. It will be appreciated that the viscoelastic corrosion protection material may optionally further comprise: from 25 to 70 wt % mineral filler; and/or from 0.05 to 2.5 wt % adhesion promoter; and/or from 5 to 40 wt % plasticizer; and/or from 5 to 30 wt % tackifying resin. Examples of the optional mineral filler include a clay-based mineral filler, a magnesium silicate-based mineral filler, and mixtures of two or more thereof. Examples of the optional adhesion promoter include a thiosilane and/or a liquid carboxylated nitrile butadiene rubber. Examples of the optional plasticizer include chlorinated paraffin, organo phosphates or phthalates, aromatic hydrocarbons and mixtures of two or more thereof. Examples of the optional tackifying resin include a hydrocarbon tackifying resin, a phenolic tackifying resin, a rosin ester, a liquid coumarone resin and mixtures of two or more thereof. In one aspect, the viscoelastic corrosion protection material comprises, expressed as parts by mass per hundred parts by mass elastomer, the following: FME 100, filler 75-150, plasticiser 70-150, tackifying resin 50-125, and other additives 1-7. In this aspect, the viscoelastic corrosion protection material may comprise, expressed as parts by mass per hundred parts by mass elastomer, the following: first FME 70-100, optional second FME 0-30, mineral filler 75-150, first plasticiser 30-70, second plasticiser 40-80, first tackifying resin 25-50, second tackifying resin 25-75, adhesion promoter 2.5-7.0, first antioxidant 0.5-1.5, second antioxidant 0.5-1.5, colour modifier 0.3-1.5.

The layer 13 of viscoelastic corrosion protection material according to an embodiment is provided on and carried by a supporting backing 14 which comprises glass fibres either formed as matting or in a woven sheet. The layer 13 of viscoelastic corrosion protection material and its supporting backing together form an innerwrap 9 of the anti-corrosive wrapping 12. The backing 14 is substantially non-elastic, but the backing 14 is flexible and can be curled in a roll (see FIG. 3 and the associated description below) and so the innerwrap 9 is wrappable around the pipe 10 (see also FIGS. 2, 4 and 5 and the associated description below). The backing 14 can comprise chopped glass strand matting of the type typically used as fibreglass reinforcement for polyester resin in a hand lay-up. Such glass strand matting typically comprises glass fibres randomly laid across each other and held together by a binder. Alternatively, a sheet of glass fibres woven into a fabric may also be used, sometimes called a tissue of glass fibres. The glass fibres used can be E-glass, an alumino-borosilicate with less than 1% w/w alkali oxides; this makes the backing 14 resistant to alkaline conditions. The backing 14 will typically have a weight in range of 100 g to 300 g per square metre. It can have no surface finish or a surface finish can be applied, for instance by applying a silane based adhesion promoter. The innerwrap 9 is provided in widths of for instance 100 mm, 140 mm or 170 mm and has a thickness of 0.8 mm to 2 mm. In FIG. 3 a release sheet 20 is shown, which will be further described below.

Figure 2:
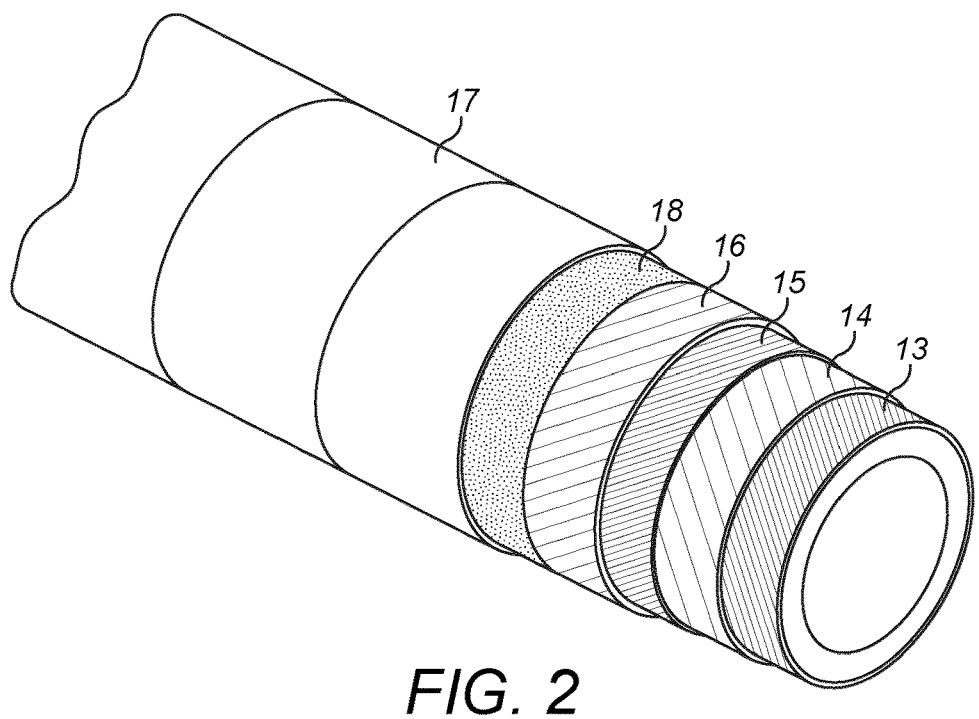
FIG. 2 is a schematic perspective view of the embodiment of FIG. 1 with each layer exposed for purposes of illustration.
Figure 3:
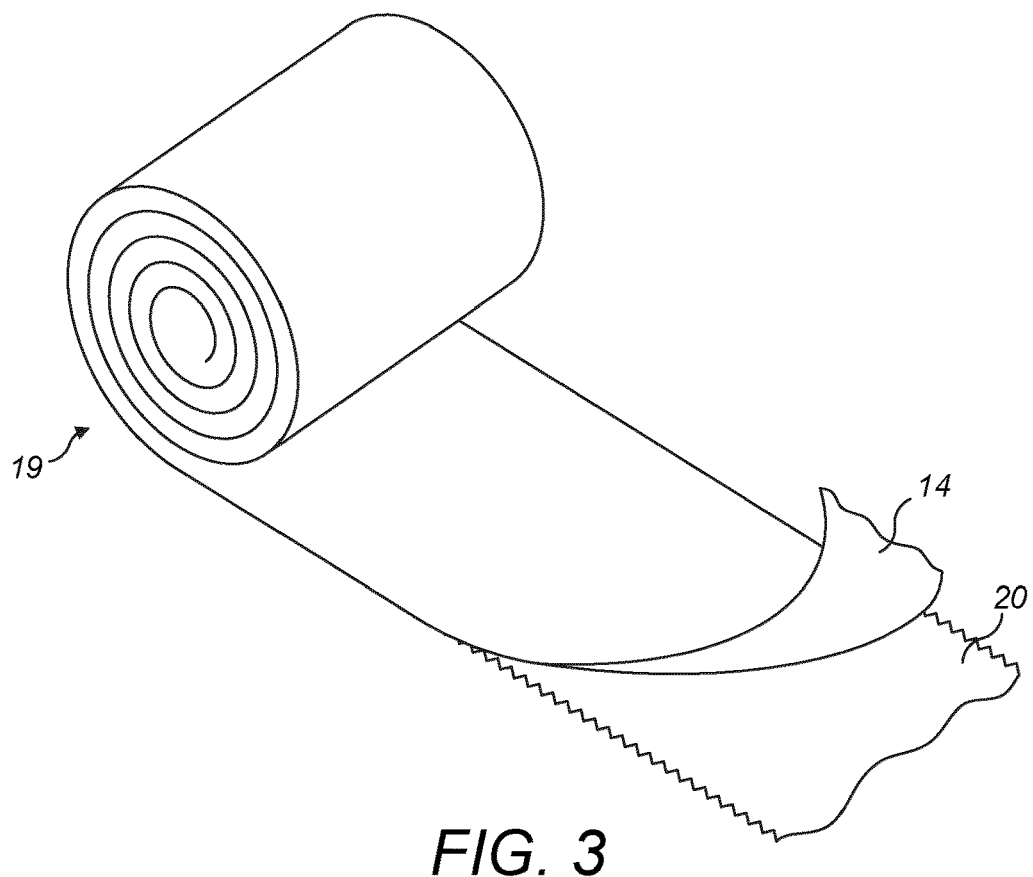
FIG. 3 is a schematic perspective view of a roll of innerwrap (or outerwrap) according to an embodiment, prior to use.

Also shown in the FIGS. 1 and 2 is an outerwrap 16 which also comprises glass fibres either formed as matting or in a woven sheet. The outerwrap 16 is substantially non-elastic, but it is flexible and can be curled in a roll (the FIG. 3 illustration could apply equally to the outerwrap) and is wrappable around the innerwrap 9 previously wrapped around the pipe 10. The outerwrap 16 can comprise chopped glass strand matting of the type typically used as fibreglass reinforcement for polyester resin in a hand lay-up. Such glass strand matting typically comprises glass fibres randomly laid across each other and held together by a binder. Alternatively, a sheet of glass fibres woven into a fabric may also be used, sometimes called a tissue of glass fibres. The glass fibres used can be E-glass, an alumino-borosilicate with less than 1% w/w alkali oxides; this makes the outerwrap 16 resistant to alkaline conditions. The outerwrap 16 will typically have a weight in range of 100 g to 300 g per square metre. It can have no surface treatment or it may have a surface treatment, for instance of a silane based adhesion promoter. The outerwrap 16 is provided in widths of for instance 100 mm, 140 mm or 170 mm (the width of the outerwrap 16 for any particular application will be chosen to match that of the underlying innerwrap 9) and has a thickness of 150 microns to 300 microns.

The glass fibre outerwrap 16 is impregnated with and thereby carries an adhesive 15, for instance a moisture curing thermosetting polymer mixture, which is present and active on at least one surface of the outerwrap 16, the surface which in the FIG. 1 is an inwardly facing surface that faces an outwardly facing surface of the innerwrap 9. The adhesive 15 carried by the outerwrap 16 allows the outerwrap 16 to be adhered to the innerwrap 9 and in the FIGS. 1 an 2 there is shown a layer of this adhesive 15 interposed between the inward facing surface of the outerwrap 16 and the outward facing surface of the innerwrap 9. The moisture curing adhesive 15 is typically a moisture-cure polyurethane or polyurethane prepolymer. These are isocyanate-terminated prepolymers that are formulated to cure with ambient temperature water (e.g. water at 15 to 25 degrees Celsius). Other types of adhesives with different curing methods could be used, e.g. epoxy, urethane or polyester adhesives.

The adhesive 15 of the outerwrap 16, in an embodiment, wets out and adheres to at least some of the glass fibres of the outerwrap 16. The adhesive 15 of the outerwrap 16 may also wet out and adhere, in use, to at least some of the glass fibres of the inner wrap 9.

In this respect, the glass fibres of the innerwrap 9 are substantially or at least partially uncoated prior to use and can therefore advantageously be wetted and penetrated, in use, by the adhesive of the adjacent layer of outerwrap 16.

In an embodiment, the adhesive 15 of the outerwrap 16 is or comprises a moisture curable adhesive, in a further embodiment a polyurethane moisture curable adhesive, which has been found to wet out and bond to the glass fibre used in the anticorrosive wrapping according to the present disclosure.

Additionally shown in FIG. 2 (but not in FIG. 1) there is a pressure bandage 17, wrapped around the outside of the outerwrap 16, i.e. applying pressure to the outward surface of the outerwrap 16. The pressure bandage 17 is formed of an elastic material such as PVC (Polyvinyl Chloride) or LLDPE (Linear Low-Density Polyethylene) or LDPE (Low-Density Polyethylene) and can be stretched when wrapped around the outerwrap 16, so that it can apply pressure to rest of the anti-corrosive wrapping 12, namely the innerwrap 9 with its layer 13 of viscoelastic thermoplastic corrosion material, the adhesive layer 15 and the outerwrap 16. The viscoelastic corrosion prevention material 13 will under the pressure applied by the pressure bandage flow to fill or substantially fill a volume defined between the inward facing surface of the backing 14 (the surface of the backing 14 facing the outer, outwardly facing, surface of the pipe 10) and the outer, outwardly facing surface of the pipe 10.

The pressure bandage 17 will remain in place while the adhesive 15 cures. In an embodiment, the outerwrap borne adhesive is cured while the outerwrap is under pressure from the pressure bandage. After this the pressure bandage 17 can be removed to leave in place the anti-corrosive wrapping 12 illustrated in FIG. 1. If it be desired to leave the pressure bandage 17 in place, then the pressure bandage may carry a layer of adhesive 18 as shown in FIG. 2, in order to hold the bandage in place.

A method of protecting the pipe 10 with the anti-corrosion wrapping 12 will now be described.

In the method a roll 19 of innerwrap 9, as illustrated in FIG. 3, is supplied and used by the human operator implementing the method, the roll 19 comprising the backing 14 described above, which carries the layer 13 of viscoelastic thermoplastic corrosion protection material. A release layer 20 may be used to cover the layer 13 of viscoelastic thermoplastic corrosion protection material. The release layer 20 may be a layer of polyester, since this has a smooth surface and has good wind up properties, and is resistant to buckling (buckling is a difficulty when using paper release layers). During manufacturing, the layer 13 of thermoplastic corrosion protection material will be applied to one surface of the glass fibre matting backing 14 and then the layer 13 will be overlaid with the release layer 20 prior to rolling the innerwrap 9 to form the roll 19. The release layer 20 acts to ensure that the layer 13 of thermoplastic corrosion protection material engages only one surface of the innerwrap 9 in the roll.

Figure 4:
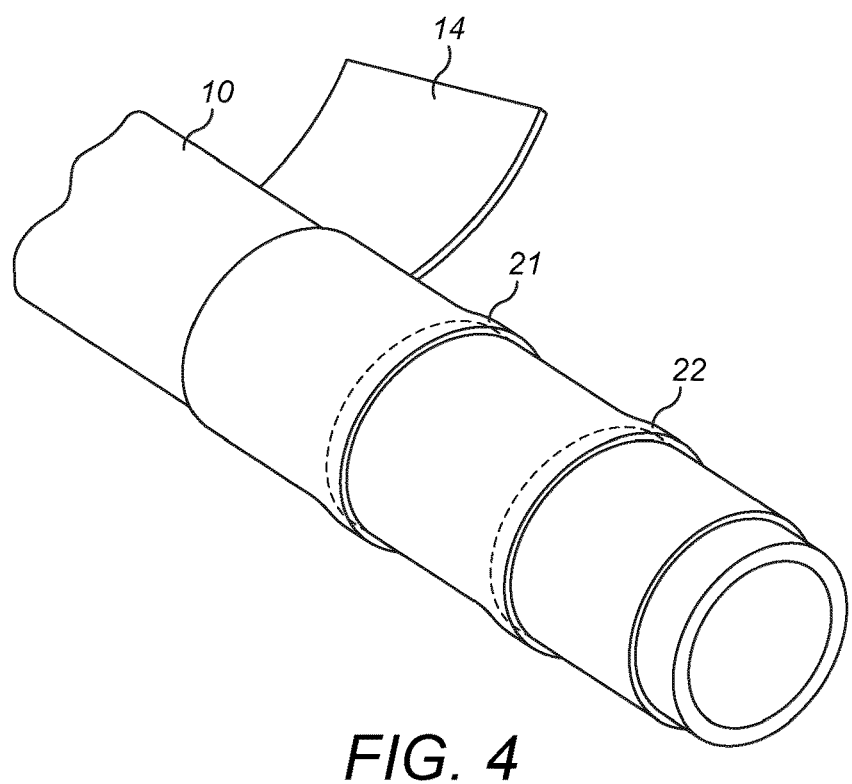
FIG. 4 is a schematic perspective view of a pipe being wrapped in a helical fashion by an innerwrap of the anti-corrosive wrapping of the present disclosure, with overlaps shown by use of dotted lines.
Figure 5:
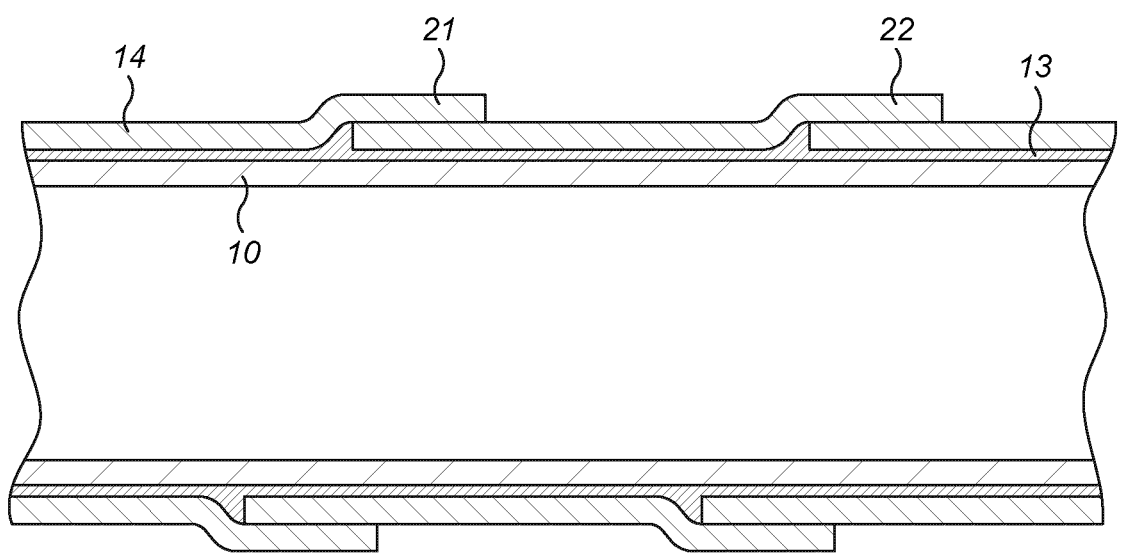
FIG. 5 is a cross-section taken in plane passing through a central axis of the pipe of FIG. 4 showing a part of the pipe and a part of the innerwrap wrapped around the pipe, with overlaps illustrated.

The human operator will unroll the roll of the innerwrap 9 and remove the release layer 20. The human operator will wrap the innerwrap 9 helically, in other words in a spiral fashion, around the pipe 10, as shown in FIG. 4, with the layer of corrosion protection material 13 carried by the backing 14 engaging and thereby covering the outer, outwardly facing, surface of the pipe 10. The innerwrap 9 will typically be hand applied, although a wrapping machine of a known variety could be used. The innerwrap 9 will be wound with an overlapping edge, as illustrated in FIGS. 4 and 5. In the FIG. 4 the extent of the overlap is shown by the dotted lines. In the FIGS. 4 and 5 the overlaps regions are shown as 21 and 22, with a trailing edge of a section of the helically wound innerwrap 9 overlaid by a leading edge of an adjacent section of the helically wound innerwrap 9. Typically the innerwrap 9 will be supplied in a range of different widths, such as 100 mm, 140 mm. 170 mm, 225 mm, 300 mm or 500 mm. The overlap will typically have a width of from 25 mm to 55% of the nominal width of innerwrap 9. The release layer 20 is provided with pinked edges, as can be seen in FIG. 3. The pinked edges assist the operator in tearing by hand the release layer 20 when it has been separated from the innerwrap 9 during wrapping of the innerwrap around the pipe or pipe fitting. If there is an adjacent run of innerwrap 9 then it will be overlaid on the previously laid run of innerwrap 9 at the meeting edges of the runs.

In the method a roll of outerwrap 16 is supplied and used by the human operator implementing the method, the roll comprising the outerwrap 16 described above which is impregnated with the moisture curing thermosetting adhesive. The human operator will wind the outerwrap 16 around the innerwrap 9 previously wound around the pipe 10. The outerwrap 16 will typically be hand applied, although a wrapping machine of a known variety could be used. The sheet of impregnated outerwrap 16 is passed by the operator through water held in a suitable container prior to wrapping the outerwrap 16 around the innerwrap 9, thereby initiating curing of the adhesive, which curing is then completed in situ with the outerwrap 16 wound around the innerwrap 9 previously wound around the pipe 10. The outerwrap 16 will be helically wound with an overlapping edge, in the manner previously described for the innerwrap 9. Typically the outerwrap 16 will be supplied in a range of different widths, such as 100 mm, 140 mm, 170 mm, 225 mm, 300 mm or 500 mm (with the width of outerwrap 14 for a particular application chosen to match the width of innerwrap 9 used for the application). The overlap at the edges of the outerwrap will typically have a width of from 25 mm to 55% of the nominal width of outerwrap 16. If there is an adjacent run of outerwrap 16 then it will be overlaid on the previously laid run of outerwrap 16 at the meeting edges of the runs.

As mentioned above, the moisture curing adhesive 15 is typically a moisture-cure polyurethane or polyurethane prepolymer. These are isocyanate-terminated prepolymers that are formulated to cure with ambient temperature water (e.g. water at 5 to 50 degrees Celsius).

In the method the pressure bandage 17 is wound tightly around the outerwrap 16 to apply pressure to the outerwrap 16, the innerwrap 9 and, in particular, the viscoelastic thermoplastic corrosion prevention material 13 of the innerwrap 9, causing the viscoelastic thermoplastic corrosion material 13 to flow to completely or substantially fill a volume defined between the outer, outwardly facing surface of the pipe 10 and the inner, inwardly facing surface of the backing 14.

With the pressure bandage 17 wound tightly in place (either by hand or using a winding machine) and applying pressure as described above the moisture curing thermosetting adhesive 15 is allowed to fully cure. The moisture curing thermosetting adhesive 15 is pre-impregnated in the outerwrap 16 and when the outerwrap 16 is wound around the innerwrap 9 and, in particular, when the pressure is applied by the pressure bandage 17 on the outerwrap 16 and the innerwrap 9, then the moisture curing thermosetting adhesive 15, while in its liquid state, impregnates also the glass fibre sheet forming the innerwrap 9. Then, when the moisture curing thermosetting adhesive 15 cures, a homogeneous and continuous bond is formed between the outerwrap 16 and the innerwrap 9, with the outerwrap 16 and the innerwrap 9 forming a continuous layer, with little risk of delamination between the outerwrap 16 and the innerwrap 9. This contrasts with prior art wrappings in which thermoplastic tapes were used for the innerwrap 9; the present disclosure overcomes the problem that adhesion to thermoplastics is hard to reliably achieve or requires a mechanical pre-treatment to ensure a good bond (delamination is a significant risk in wrapping with one or more thermoplastic tape layers).

The pressure bandage 17 can be left in place or can be removed after the moisture curing thermosetting adhesive 15 has fully cured.

The fact that the moisture curing thermosetting adhesive 15 cures while under pressure from the pressure bandage 17 means that the viscoelastic thermoplastic corrosion material 13 is subject to a compressive force after the curing has completed. This gives the wrapping 12 a 'self-healing' property, since if the wrapping 12 is damaged by penetration then the viscoelastic thermoplastic corrosion material 13 will flow to fill any void or holiday formed by the damage to the wrapping 12.

The glass fibre outerwrap 16 provides a good protective layer to prevent damage to the pipe 10 in use, e.g. from sharp objects in the surrounding soil, such as flints.

The glass fibre outerwrap 16 and the glass fibre innerwrap 9 are both substantially inelastic, which minimises stretching and consequent sagging and separation from the pipe 10, for instance under forces applied on the wrapping 12, when applied to a buried pipe, by soil stresses.

The use of the viscoelastic thermoplastic corrosion material 13 described above means that the wrapping 12 can be used without significant or without any surface preparation of the outer, outwardly facing surface, of the pipe 10. Also, it is not necessary to apply a liquid coating primer to the pipe 10 prior to use of the wrapping 12 of the present disclosure. The use of a wrapping 12 which does not need a field applied spray coating (as opposed to a factory applied coating) is advantageous since it avoids the need for transport of cumbersome and bulky spraying equipment and avoids the need for atomisation of a thermosetting material on site, such being potentially hazardous if inhaled.

The viscoelastic thermoplastic corrosion prevention material 13 could comprise a polymer or polymers with only covalent bonds and no cross-linking so that single polymer chains remain so for their whole lifetime. An example would be poly-isobutene, with 180-540 isobutene units in a polymer chain. The polymer structure allows for cold flow and even at very low temperatures, the material will over time fill into pores, cavities and voids, e.g., in a steel pipe surface. The viscoelastic thermoplastic corrosion prevention material will permanently remain soft and tacky while also remaining resistant to weathering. As mentioned above, the thermoplastic corrosion prevention material 13 could alternatively comprise the material described in WO2019/008353 A1, namely a material comprising 10 to 50 wt % functionally modified elastomer (in an embodiment from 10 to 30 wt %, in a further embodiment 12 to 20 wt %) and 0.1 to 20 wt % discrete reinforcing strands dispersed within the material.

Viscoelastic materials exhibit both viscous and elastic characteristics when undergoing deformation. Viscous materials resist shear flow and strain linearly with time when a stress is applied. Elastic materials strain when stretched and then return their original state once the stress is removed. Viscoelastic materials have elements of both of these properties and, as such, exhibit time-dependent strain. The viscosity of a viscoelastic substance gives the substance a strain rate dependence on time. Purely elastic materials do not dissipate energy (heat) when a load is applied, but a viscoelastic material loses energy when a load is applied and then removed. Hysteresis is observed in the stress-strain curve, with the area of the loop being equal to the energy lost during the loading cycle. Specifically, when a stress is applied to a viscoelastic material, parts of the long polymer chain change positions. This movement or rearrangement is sometimes called creep. Polymers remain a solid material even when these parts of their chains are rearranging in order to accompany the stress, and as this occurs, it creates a back stress in the material. When the back stress is the same magnitude as the applied stress, the material no longer creeps. When the original stress is taken away, the accumulated back stresses will cause the polymer to return to its original form.

The viscoelastic properties of a viscoelastic material can be measured by oscillation testing in a rheometer. The oscillation testing measures the material's modulus as a ratio of Shear Stress to Shear Strain and determines a phase angle between the applied input Shear Stress and measured Shear Strain (for a theoretical purely elastic material the stress and strain are in phase and the phase angle is zero and for a theoretical purely viscous material the stress and strain are a quarter of a cycle out of the phase and the phase angle is therefore 90 degrees). The two measurements allow a characterization of viscoelasticity. In an embodiment, the viscoelastic thermoplastic corrosion material has a modulus in the range of 50000 Pa to 500000 Pa and a phase angle in the range of 30 to 40 when measured by a Anton Paar RheoCompas™ V1.15.0.0 type rheometer using 25 mm diameter parallel plates, 0.1% amplitude and at a frequency of 1 radian per second and at a temperature in the range 25° C. to 40° C.

The wrapping 12 of in the disclosure may be cold applied, i.e. applied at ambient temperature (typically in the range 5 degrees to 50 degrees Celsius), which significantly reduces the complexity of applying of the wrapping 12. However, it is possible that a heat shrinkable material could be used e.g. for the pressure bandage.

As mentioned above the use of the moisture curing thermosetting adhesive 15, which is initially carried by the outerwrap 16 in which it is impregnated and then migrates into the permeable innerwrap 9 prior to curing, allows for the adhering of the outerwrap 16 and innerwrap 9 together to form a substantially monolithic, continuous, homogeneous layer around the pipe 10 and thus reduces the risk of entrapment of air and/or the formation of voids between the outerwrap 16 and the innerwrap 9. This is important since such air pockets or voids could disrupt the use of non-destructive inspection techniques such as ultrasonic thickness inspection.

The anti-corrosive wrapping 12 of the present disclosure can be used for pipes or for pipe fittings connecting two adjacent pipe lengths of a pipeline. The pipe lengths themselves will often be coated with a spray applied anti-corrosive coating, applied in a factory prior to transport of the pipe lengths to a site for use to form the pipeline. A trench can be dug in which the pipeline is laid. The pipe lengths will be connected to each other by a pipe fitting in situ in the trench. The ends of the pipe lengths can be welded to the pipe fitting which connects them. The pipe fitting may or may not comprise a valve. Once the pipe lengths have been connected together in situ by the pipe fitting then an anti-corrosive wrapping 12 of the present disclosure will be wrapped around the pipe fitting and over parts of the pipe lengths adjacent to the pipe fitting.

As mentioned above, the innerwrap 9 and the outerwrap 16 can be wound around a pipe 10 or pipe fitting in a plurality of separate lengths, in an embodiment with the ends of adjacent lengths overlapping. In a method of the disclosure used when the wrapping 12 is wrapped around a welded joint formed in situ as described above ("a field joint") then the overlapping parts of at least the innerwrap 9 are located overlaying a cap of the weld, with the innerwrap 9 then extending outwardly from the cap, e.g. along pipe lengths adjacent the welded joint, and with the innerwrap 9 extending along the pipe lengths to parts of the pipe lengths which carry previously spray applied coating and with the innerwrap 9 overlaying such previously spray-coated pipe surfaces, so that there is a continuity of pipeline protection from the spray-coated pipelines sections surfaces across the welded ends of the pipeline section (where the spray coating will be absent).

While above innerwrap 9 and outerwrap 16 are each wound helically around the pipe 10 or pipe fitting, they could each be wound circumferentially around the pipe 10 or pipe fitting (i.e. so that they are not wound in way to extend along the length of the pipe or pipe fitting by virtue of the manner of wrapping).

The anti-corrosive wrapping 12 of the disclosure can be used to wrap metal pipes and/or metal pipe fittings both above and below ground. The innerwrap 9 and especially the outerwrap 16 can comprise coloured glass fibre matting or glass fibre woven material to be aesthetically pleasing, particularly for above ground uses. The innerwrap 9 and outerwrap 16 may be made of a UV stable material, especially for above ground uses.

The invention claimed is:

1. An anti-corrosive wrapping for a metal pipe and/or for a metal pipe fitting, comprising:
an innerwrap which includes: a backing comprising glass fibres; and a viscoelastic thermoplastic corrosion protection material carried by the backing; and
an outerwrap comprising glass fibres and impregnated with a curable adhesive;
wherein:
the innerwrap is wrappable around the metal pipe or the metal pipe fitting and the viscoelastic thermoplastic corrosion protection material carried by the backing can engage and can cover an external surface of the metal pipe or the metal pipe fitting; and
the outerwrap is wrappable around the innerwrap previously wrapped around the pipe and/or the pipe fitting and the adhesive impregnated in the outerwrap can engage and can penetrate the innerwrap to thereby adhere the outerwrap to the innerwrap.

2. An anti-corrosive wrapping as claimed in claim 1 wherein the backing of the innerwrap comprises glass fibre matting.

3. An anti-corrosive wrapping as claimed in claim 1 wherein the backing of the innerwrap comprises a woven glass fibre sheet.

4. An anti-corrosive wrapping as claimed in claim 1 wherein the outerwrap comprises glass fibre matting.

5. An anti-corrosive wrapping as claimed in claim 1 wherein the outerwrap comprises a woven glass fibre sheet.

6. An anti-corrosive wrapping as claimed in claim 1 comprising additionally a pressure bandage wrappable around the outerwrap to compress the outerwrap and the innerwrap and thereby to cause the viscoelastic thermoplastic corrosion protection material of the innerwrap to flow to fill a volume between the backing of the innerwrap and the pipe or the pipe fitting.

7. An anti-corrosive wrapping as claimed in claim 6 wherein the pressure bandage is formed of an elastic material.

8. An anti-corrosive wrapping as claimed in claim 6 comprising a pressure bandage adhesive for adhering the pressure bandage to the outerwrap.

9. An anti-corrosive wrapping as claimed in claim 1 wherein the curable adhesive is a moisture curable adhesive.

10. An anti-corrosive wrapping as claimed in claim 1 wherein the viscoelastic thermoplastic corrosion protection material comprises one or more of: bitumen, an elastomer, a process oil, a resin, a tackifier, a butyl rubber compound, a functionally modified elastomer, polybutene, polyisobutene.

11. An anti-corrosive wrapping as claimed in claim 1 wherein the viscoelastic corrosion protection material comprises:
from 10 to 50 wt % functionally modified elastomer; and
from 0.1 to 20 wt % discrete reinforcing strands dispersed within the adhesive component.

12. An anti-corrosive wrapping as claimed in claim 1 wherein the backing of the innerwrap is substantially inelastic and the outerwrap is substantially inelastic.

13. A method of applying anti-corrosive protection to a metal component such a metal pipe and/or a metal pipe fitting, the method comprising:
wrapping around the metal component an innerwrap which includes a backing comprising glass fibres and a viscoelastic corrosion protection material carried by the backing;
during wrapping of the innerwrap around the metal component applying the viscoelastic corrosion protection material to an external surface of metal component to cover the external surface:
after wrapping the innerwrap around the metal component, wrapping around the innerwrap an outerwrap which comprises glass fibres and is impregnated with a curable adhesive;
adhering the outerwrap to the innerwrap using the adhesive impregnated in the outerwrap, with such adhesive penetrating the innerwrap; and curing the adhesive and completing curing of the adhesive while the outerwrap is wrapped around the innerwrap.

14. A method as claimed in claim 13 wherein the curable adhesive is a moisture curable adhesive and the method comprises applying water to the outerwrap prior to wrapping the outerwrap around the innerwrap.

15. A method as claimed in claim 13 in which curing the curable adhesive forms a continuous bond between the outerwrap and the innerwrap whereby the outerwrap and the innerwrap form a continuous layer surrounding the metal component.

16. A method as claimed in claim 13 wherein the method comprises additionally, after wrapping of the outerwrap around the innerwrap, wrapping a pressure bandage around the outerwrap to apply pressure to the outerwrap and the innerwrap and to thereby cause the viscoelastic thermoplastic corrosion protection material of the innerwrap to flow to fill a volume defined between the backing of the innerwrap and the external surface of the metal component.

17. A method as claimed in claim 16 wherein the adhesive is a curable adhesive and the pressure bandage is kept wound around the outerwrap at least until curing of the adhesive is complete.

18. A method as claimed in claim 17 wherein the pressure bandage is removed when the curing of the adhesive is complete.

19. A method as claimed in claim 17 wherein the adhesive is a moisture curable adhesive and the method additionally comprises immersing the outerwrap in water prior to wrapping of the outerwrap around the innerwrap.

20. A method as claimed in claim 17 wherein curing the curable adhesive forms a continuous bond between the outerwrap and the innerwrap whereby the outerwrap and the innerwrap form a continuous layer surrounding the metal component.

21. A method as claimed in claim 13 used to apply anti-corrosive protection to a buried pipeline formed of pipe sections connected by pipe fittings, the method being used to apply the anti-corrosive protection to at least one pipe section and/or at least one pipe fitting of the pipeline.

22. A metal pipe and/or a metal pipe fitting protected from corrosion by the method of claim 13.

23. A corrosion protected article comprising a metal pipe and/or a metal pipe fitting covered by an anti-corrosive wrapping according to claim 1.

* * * * *